(12) United States Patent
Childress et al.

(10) Patent No.: US 7,442,216 B2
(45) Date of Patent: *Oct. 28, 2008

(54) COMPACT FUEL PROCESSOR

(75) Inventors: Robert E. Childress, Forest Hill, MD (US); John R. Farrell, Reisterstown, MD (US); Wendell B. Leimbach, Baltimore, MD (US); James W. Marshall, Phoenix, MD (US)

(73) Assignee: Texaco Inc., San Ramon, CA (US)

( * ) Notice: Subject to any disclaimer, the term of this patent is extended or adjusted under 35 U.S.C. 154(b) by 574 days.

This patent is subject to a terminal disclaimer.

(21) Appl. No.: 10/894,291

(22) Filed: Jul. 19, 2004

(65) Prior Publication Data

US 2005/0000160 A1    Jan. 6, 2005

Related U.S. Application Data

(63) Continuation of application No. 10/133,085, filed on Apr. 26, 2002, now Pat. No. 6,790,247.

(60) Provisional application No. 60/286,684, filed on Apr. 26, 2001.

(51) Int. Cl.
*B01J 3/00* (2006.01)

(52) U.S. Cl. .......................... 48/127.9; 48/198.6; 48/61

(58) Field of Classification Search ............... 48/61–63, 48/74, 89, 118.5, 119, 96–95, 120, 127.9, 48/128, 198.1, 211, 198.3, 212, 196, 213, 48/198.7, 215; 422/188–191, 193, 194, 198, 422/200, 201, 211, 236, 240; 429/17, 19, 429/20

See application file for complete search history.

(56) References Cited

U.S. PATENT DOCUMENTS

| | | | |
|---|---|---|---|
| 3,938,968 A | 2/1976 | White et al. | |
| 4,522,894 A | 6/1985 | Hwang et al. | |
| 4,933,242 A | 6/1990 | Koga et al. | |
| 5,015,444 A | 5/1991 | Koga et al. | |
| 5,209,906 A | 5/1993 | Watkins et al. | |
| 5,316,747 A | 5/1994 | Pow et al. | |
| 5,534,328 A | 7/1996 | Ashmead et al. | |
| 5,609,834 A | 3/1997 | Hamada et al. | |
| 6,159,434 A | 12/2000 | Gonjo et al. | |
| 6,790,247 B2 * | 9/2004 | Childress et al. | 48/198.6 |
| 6,835,354 B2 * | 12/2004 | Woods et al. | 422/139 |

FOREIGN PATENT DOCUMENTS

| | | |
|---|---|---|
| EP | A-0977293 | 2/2000 |
| WO | WO 99/36351 | 7/1999 |
| WO | 00/66487 | 11/2000 |
| WO | 00/78669 | 12/2000 |

* cited by examiner

*Primary Examiner*—Alexa D. Neckel
*Assistant Examiner*—Imran Akram
(74) *Attorney, Agent, or Firm*—Frank C. Turner; Melissa Patangia

(57) ABSTRACT

An apparatus for carrying out a multi-step process of converting hydrocarbon fuel to a substantially pure hydrogen gas feed includes a plurality of reaction zones arranged in an insulated, box-shaped, compact fuel processor. The multi-step process includes preheating the hydrocarbon fuel utilizing integration with the inherent exothermic processes utilized with the fuel processor, reacting the preheated hydrocarbon fuel to form the hydrogen rich gas, and purifying the hydrogen rich gas to produce a gas that is suitable for consumption in a fuel cell.

10 Claims, 5 Drawing Sheets

COMPACT FUEL PROCESSOR

CROSS REFERENCE TO RELATED APPLICATIONS

This application is a continuation of U.S. application Ser. No. 10/133,085, filed Apr. 26, 2002, now U.S. Pat. No. 6,790,247 B2 issued Sep. 14, 2004, which claimed priority to U.S. Provisional Patent Application No. 60/286,684, filed Apr. 26, 2001, under 35 U.S.C. §119.

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage that inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of reformers to convert the hydrocarbons to a hydrogen rich gas stream which can be used as a feed for fuel cells.

Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming (SR), autothermal reforming (ATR), catalytic partial oxidation (CPOX), or non-catalytic partial oxidation (POX). The cleanup processes are usually comprised of a combination of desulfurization, high temperature water-gas shift, low temperature water-gas shift, selective CO oxidation, or selective CO methanation. Alternative processes include hydrogen selective membrane reactors and filters.

Despite the above work, there remains a need for a simple unit for converting a hydrocarbon fuel to a hydrogen rich gas stream for use in conjunction with a fuel cell.

SUMMARY OF THE INVENTION

The present invention is generally directed to an apparatus for converting hydrocarbon fuel into a hydrogen rich gas. In one illustrative embodiment of the present invention includes a compact fuel processor for converting a hydrocarbon fuel feed into hydrogen rich gas, in which the fuel processor assembly includes a container having a bottom and substantially vertical sides, a removable top for the container, wherein the removable top includes a manifold, a plurality of connected process units positioned in a spiraling geometry within the container, and a ceramic casting that fills the void space inside the container, wherein the plurality of connected process units forms a channel through the ceramic casting. In such an embodiment, the plurality of connected process units includes an autothermal reforming catalyst bed, a first heat exchanger positioned adjacent to the autothermal reforming catalyst bed, a desulfurization agent bed positioned adjacent to the first heat exchanger, a second heat exchanger positioned adjacent to the desulfurization agent bed, a water gas shift catalyst bed positioned adjacent to the second heat exchanger, a third heat exchanger positioned adjacent to the water gas shift catalyst bed, and a carbon monoxide oxidation catalyst bed positioned adjacent to the third heat exchanger.

Optionally, an embodiment of the present invention comprises a second plurality of connected process units positioned within the container, wherein the second plurality of connected process units forms a channel through the ceramic casting, wherein the second plurality of connected process units includes an anode tail gas oxidation catalyst bed, and a pre-heat exchanger positioned adjacent to the anode tail gas oxidation catalyst bed. Such an apparatus utilizes its manifold to provide preheating means for preheating the hydrocarbon before the hydrocarbon fuel contacts the autothermal reforming catalyst bed. In one embodiment of the present invention, each of the first, second, and third heat exchangers has a tube side and a process side, and the preheating means includes introducing the hydrocarbon fuel to the tube side of at least one of the first heat exchanger, the second heat exchanger, or the third heat exchanger. The manifold includes means for introducing the hydrocarbon fuel to the tube side of the third heat exchanger to produce a first preheated feed, means for introducing the first preheated feed to the tube side of the second heat exchanger to produce a second preheated feed, means for introducing the second preheated feed to the tube side of the first heat exchanger to produce a third preheated feed, and means for introducing the third preheated feed to the autothermal reforming catalyst bed. Alternatively, if an anode tail gas oxidizer is included with the processor design, or if a fourth heat exchanger is otherwise included in the design downstream of the preferential oxidation catalyst bed, the manifold also includes means for introducing the third preheated feed to the pre-heat exchanger or the fourth heat exchanger before introducing the preheated feed to the autothermal reforming catalyst bed. It is envisioned that a preferred aspect of the manifold is that the means for routing streams throughout the processor is by use of a piping, tubing, or an equivalent, that flanges or snaps into place in the appropriate locations with the box processor.

Another such illustrative embodiment includes a method for using such a box-shaped compact fuel processor for converting a hydrocarbon fuel feed into hydrogen rich gas. The method includes providing a box-shaped fuel processor comprising an autothermal reforming catalyst bed, a first heat exchanger positioned adjacent to the autothermal reforming catalyst bed, the first heat exchanger having a tube side and a process side, a desulfurization agent bed positioned adjacent to the first heat exchanger, a second heat exchanger positioned adjacent to the desulfurization agent bed, the second heat exchanger having a tube side and a process side, a water gas shift catalyst bed positioned adjacent to the second heat exchanger, a third heat exchanger positioned adjacent to the water gas shift catalyst bed, the third heat exchanger having a tube side and a process side, and a carbon monoxide oxidation catalyst bed positioned adjacent to the third heat exchanger. In this preferred embodiment of the present invention, the box-shaped processor may be used to preheat the hydrocarbon fuel in the tube side of at least one of the first heat exchanger, the second heat exchanger, or the third heat exchanger, then reform the preheated hydrocarbon fuel in the autothermal reforming catalyst bed to produce a first hydrogen product, then remove the sulfur compounds from the first hydrogen product in the desulfurization agent bed to produce a second hydrogen product, then remove carbon monoxide from the second hydrogen product in the water gas shift catalyst bed to produce a third hydrogen product, then introduce an oxygen-containing gas to the third hydrogen product to produce a fourth hydrogen product, and then oxidize the fourth hydrogen product to produce a hydrogen rich gas that is substantially free of carbon monoxide. It is a preferred aspect of this embodiment that the hydrogen rich gas produced is suitable for direct feed to a fuel cell, or for storage in a metal hydride storage system, or contains less than about 50 ppm carbon monoxide, or more preferably less than about 10 ppm carbon monoxide.

BRIEF DESCRIPTION OF THE DRAWINGS

The description is presented with reference to the accompanying drawings in which.

DESCRIPTION OF ILLUSTRATIVE EMBODIMENTS

The present invention is generally directed to an apparatus for converting hydrocarbon fuel into a hydrogen rich gas. In a preferred aspect, the apparatus and method described herein relate to a compact fuel processor for producing a hydrogen rich gas stream from a hydrocarbon fuel for use in fuel cells. However, other possible uses are contemplated for the apparatus and method described herein, including any use wherein a hydrogen rich stream is desired. Accordingly, while the invention is described herein as being used in conjunction with a fuel cell, the scope of the invention is not limited to such use.

Each of the illustrative embodiments of the present invention describe a fuel processor or a process for using such a fuel processor with the hydrocarbon fuel feed being directed through the fuel processor. The hydrocarbon fuel may be liquid or gas at ambient conditions as long as it can be vaporized. As used herein the term "hydrocarbon" includes organic compounds having C—H bonds which are capable of producing hydrogen via a partial oxidation or steam reforming reaction. The presence of atoms other than carbon and hydrogen in the molecular structure of the compound is not excluded. Thus, suitable fuels for use in the method and apparatus disclosed herein include, but are not limited to hydrocarbon fuels such as natural gas, methane, ethane, propane, butane, naphtha, gasoline, and diesel fuel, and alcohols such as methanol, ethanol, propanol, and the like.

The fuel processor feeds include hydrocarbon fuel, oxygen, and water. The oxygen can be in the form of air, enriched air, or substantially pure oxygen. The water can be introduced as a liquid or vapor. The composition percentages of the feed components are determined by the desired operating conditions, as discussed below.

The fuel processor effluent stream from the present invention includes hydrogen and carbon dioxide and can also include some water, unconverted hydrocarbons, carbon monoxide, impurities (e.g. hydrogen sulfide and ammonia) and inert components (e.g., nitrogen and argon, especially if air was a component of the feed stream).

Figure 1:
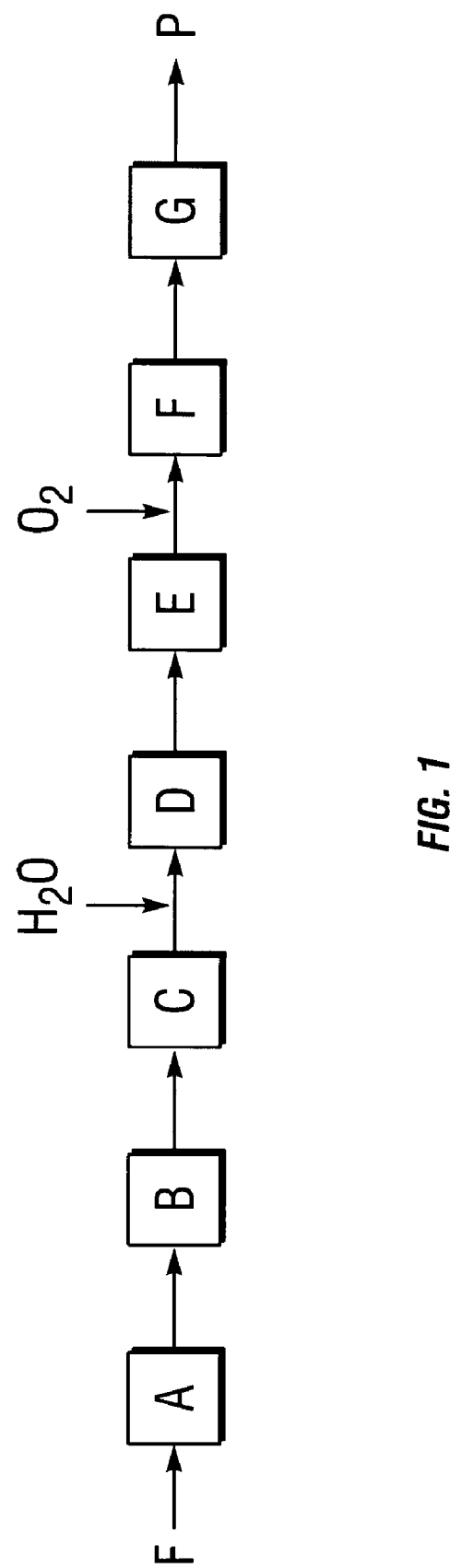
FIG. 1 depicts a simple process flow diagram for one illustrative embodiment of the present invention.

FIG. 1 depicts a general process flow diagram illustrating the process steps included in the illustrative embodiments of the present invention. One of skill in the art should appreciate that a certain amount of progressive order is needed in the flow of the reactants through the reactors disclosed herein.

Process step A is an autothermal reforming process in which two reactions, partial oxidation (formula I, below) and optionally also steam reforming (formula II, below), are combined to convert the feed stream F into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \quad (I)$$

$$CH_4 + H_2O \rightarrow 3H_2 + CO \quad (II)$$

The partial oxidation reaction occurs very quickly to the complete conversion of oxygen added and produces heat. The steam reforming reaction occurs slower and consumes heat. A higher concentration of oxygen in the feed stream favors partial oxidation whereas a higher concentration of water vapor favors steam reforming. Therefore, the ratios of oxygen to hydrocarbon and water to hydrocarbon become characterizing parameters. These ratios affect the operating temperature and hydrogen yield.

The operating temperature of the autothermal reforming step can range from about 550° C. to about 900° C., depending on the feed conditions and the catalyst. The invention uses a catalyst bed of a partial oxidation catalyst with or without a steam reforming catalyst. The catalyst may be in any form including pellets, spheres, extrudates, monoliths, and the like. Partial oxidation catalysts should be well known to those with skill in the art and are often comprised of noble metals such as platinum, palladium, rhodium, and/or ruthenium on an alumina washcoat on a monolith, extrudate, pellet or other support. Non-noble metals such as nickel or cobalt have been used. Other washcoats such as titania, zirconia, silica, and magnesia have been cited in the literature. Many additional materials such as lanthanum, cerium, and potassium have been cited in the literature as "promoters" that improve the performance of the partial oxidation catalyst.

Steam reforming catalysts should be known to those with skill in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium.

Process step B is a cooling step for cooling the synthesis gas stream from process step A to a temperature of from about 200° C. to about 600° C., preferably from about 300° C. to about 500° C., and more preferably from about 375° C. to about 425° C., to optimize the temperature of the synthesis gas effluent for the next step. This cooling may be achieved with heat sinks, heat pipes or heat exchangers depending upon the design specifications and the need to recover/recycle the heat content of the gas stream. One illustrative embodiment for step B is the use of a heat exchanger utilizing feed stream F as the coolant circulated through the heat exchanger. The heat exchanger can be of any suitable construction known to those with skill in the art including shell and tube, plate, spiral, etc. Alternatively, or in addition thereto, cooling step B may be accomplished by injecting additional feed components such as fuel, air or water. Water is preferred because of its ability to absorb a large amount of heat as it is vaporized to steam. The amounts of added components depend upon the degree of cooling desired and are readily determined by those with skill in the art.

Process step C is a purifying step. One of the main impurities of the hydrocarbon stream is typically sulfur, which is converted by the autothermal reforming step A to hydrogen sulfide. The processing core used in process step C preferably includes zinc oxide and/or other material capable of absorbing and converting hydrogen sulfide, and may include a support (e.g., monolith, extrudate, pellet etc.). Desulfurization is accomplished by converting the hydrogen sulfide to water in accordance with the following reaction formula III:

$$H_2S + ZnO \rightarrow H_2O + ZnS \qquad (III)$$

Other impurities such as chlorides can also be removed. The reaction is preferably carried out at a temperature of from about 300° C. to about 500° C., and more preferably from about 375° C. to about 425° C. Zinc oxide is an effective hydrogen sulfide absorbent over a wide range of temperatures from about 25° C. to about 700° C. and affords great flexibility for optimizing the sequence of processing steps by appropriate selection of operating temperature.

The effluent stream may then be sent to a mixing step D in which water is optionally added to the gas stream. The addition of water lowers the temperature of the reactant stream as it vaporizes and supplies more water for the water gas shift reaction of process step E (discussed below). The water vapor and other effluent stream components are mixed by being passed through a processing core of inert materials such as ceramic beads or other similar materials that effectively mix and/or assist in the vaporization of the water. Alternatively, any additional water can be introduced with feed, and the mixing step can be repositioned to provide better mixing of the oxidant gas in the CO oxidation step G disclosed below.

Process step E is a water gas shift reaction that converts carbon monoxide to carbon dioxide in accordance with formula IV:

$$H_2O + CO \rightarrow H_2 + CO_2 \qquad (IV)$$

This is an important step because carbon monoxide, in addition to being highly toxic to humans, is a poison to fuel cells. The concentration of carbon monoxide should preferably be lowered to a level that can be tolerated by fuel cells, typically below 50 ppm. Generally, the water gas shift reaction can take place at temperatures of from 150° C. to 600° C. depending on the catalyst used. Under such conditions, most of the carbon monoxide in the gas stream is converted in this step.

Low temperature shift catalysts operate at a range of from about 150° C. to about 300° C. and include for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like.

High temperature shift catalysts are preferably operated at temperatures ranging from about 300° C. to about 600° C. and can include transition metal oxides such as ferric oxide or chromic oxide, and optionally including a promoter such as copper or iron silicide. Also included, as high temperature shift catalysts are supported noble metals such as supported platinum, palladium and/or other platinum group members.

The processing core utilized to carry out this step can include a packed bed of high temperature or low temperature shift catalyst such as described above, or a combination of both high temperature and low temperature shift catalysts. The process should be operated at any temperature suitable for the water gas shift reaction, preferably at a temperature of from 150° C. to about 400° C. depending on the type of catalyst used. Optionally, a cooling element such as a cooling coil may be disposed in the processing core of the shift reactor to lower the reaction temperature within the packed bed of catalyst. Lower temperatures favor the conversion of carbon monoxide to carbon dioxide. Also, a purification processing step C can be performed between high and low shift conversions by providing separate steps for high temperature and low temperature shift with a desulfurization module between the high and low temperature shift steps.

Process step F is a cooling step performed in one embodiment by a heat exchanger. The heat exchanger can be of any suitable construction including shell and tube, plate, spiral, etc. Alternatively a heat pipe or other form of heat sink may be utilized. The goal of the heat exchanger is to reduce the temperature of the gas stream to produce an effluent having a temperature preferably in the range of from about 90° C. to about 150° C.

Oxygen is added to the process in step F. The oxygen is consumed by the reactions of process step G described below. The oxygen can be in the form of air, enriched air, or substantially pure oxygen. The heat exchanger may by design provide mixing of the air with the hydrogen rich gas. Alternatively, the embodiment of process step D may be used to perform the mixing.

Process step G is an oxidation step wherein almost all of the remaining carbon monoxide in the effluent stream is converted to carbon dioxide. The processing is carried out in the presence of a catalyst for the oxidation of carbon monoxide and may be in any suitable form, such as pellets, spheres, monolith, etc. Oxidation catalysts for carbon monoxide are known and typically include noble metals (e.g., platinum, palladium) and/or transition metals (e.g., iron, chromium, manganese), and/or compounds of noble or transition metals, particularly oxides. A preferred oxidation catalyst is platinum on an alumina washcoat. The washcoat may be applied to a monolith, extrudate, pellet or other support. Additional materials such as cerium or lanthanum may be added to improve performance. Many other formulations have been cited in the literature with some practitioners claiming superior performance from rhodium or alumina catalysts. Ruthenium, palladium, gold, and other materials have been cited in the literature as being active for this use.

Two reactions occur in process step G: the desired oxidation of carbon monoxide (formula V) and the undesired oxidation of hydrogen (formula VI) as follows:

$$CO + \tfrac{1}{2}O_2 \rightarrow CO_2 \qquad (V)$$

$$H_2 + \tfrac{1}{2}O_2 \rightarrow H_2O \qquad (VI)$$

The preferential oxidation of carbon monoxide is favored by low temperatures. Since both reactions produce heat it may be advantageous to optionally include a cooling element such as a cooling coil disposed within the process. The operating temperature of process is preferably kept in the range of from about 90° C. to about 150° C. Process step G preferably reduces the carbon monoxide level to less than 50 ppm, which is a suitable level for use in fuel cells, but one of skill in the art should appreciate that the present invention can be adapted to produce a hydrogen rich product with of higher and lower levels of carbon monoxide.

The effluent exiting the fuel processor is a hydrogen rich gas containing carbon dioxide and other constituents which may be present such as water, inert components (e.g., nitrogen, argon), residual hydrocarbon, etc. Product gas may be used as the feed for a fuel cell or for other applications where a hydrogen rich feed stream is desired. Optionally, product gas may be sent on to further processing, for example, to remove the carbon dioxide, water or other components.

Figure 2:
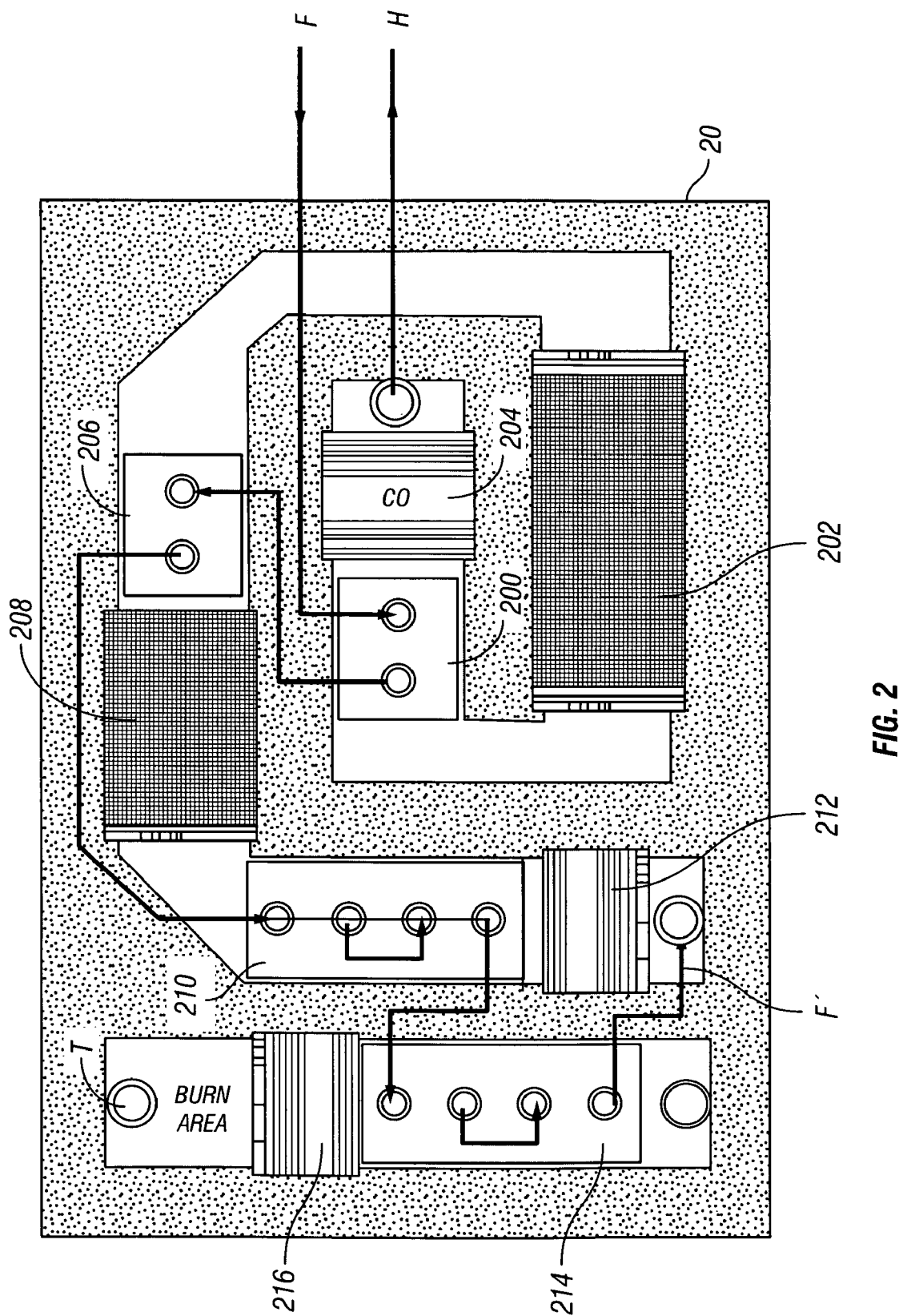
FIG. 2 depicts a first illustrative embodiment of a box-shaped compact fuel processor of the present invention.

FIG. 2 depicts an overhead view of box-shaped fuel processor 20 that is an illustrative embodiment of the present invention, with the top manifold (not shown) removed. Although a box shape is illustrated in this embodiment, it is envisioned that any number of sides is adequate to carry out this invention, provided that the outer walls are flat. The compact processor 20 contains various process units, as described generally above, and as will be discussed in detail below. Surrounding the process units in this illustrative embodiment is a ceramic casting, which provides insulation for the processor and its individual process units. Also in this illustrative embodiment, the process units are substantially rectangular in shape, as are the connecting channels between each process unit. One of ordinary skill in the art should see and appreciate that this design offers the advantages of inexpensive construction due to its simple casting construction, as well as easy access to each process unit for assembly, catalyst replacement, and other maintenance. One of ordinary skill in the art should also appreciate that such a manifold system will allow for significant heat integration, specifically allowing preheating of the hydrocarbon fuel feed F on the utility side of the various process heat exchangers, as will be discussed in further detail below.

Figure 3:
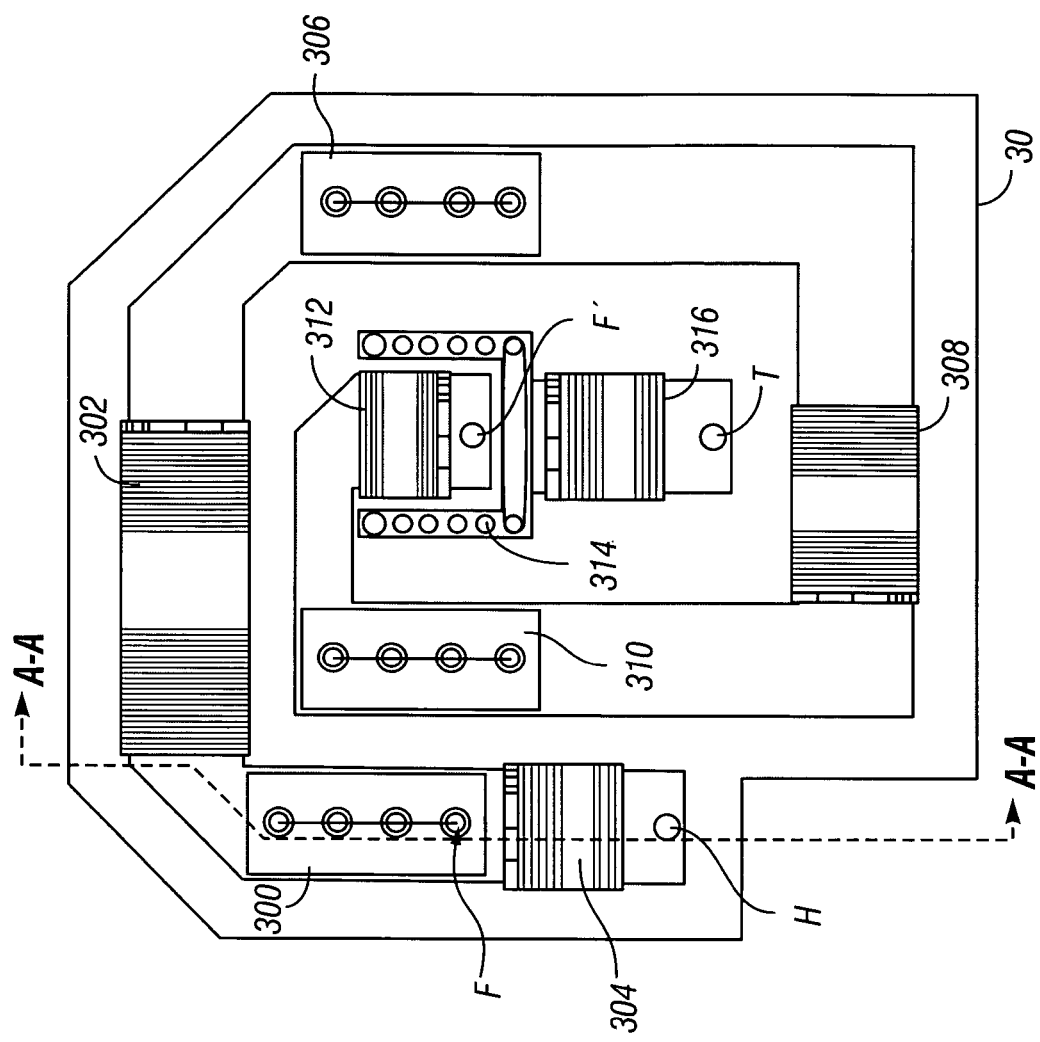
FIG. 3 depicts a second illustrative embodiment of a box-shaped compact fuel processor of the present invention.
Figure 3:
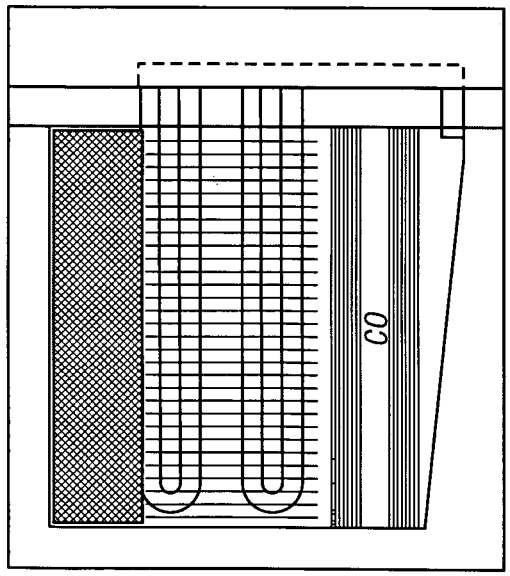
Figure 4:
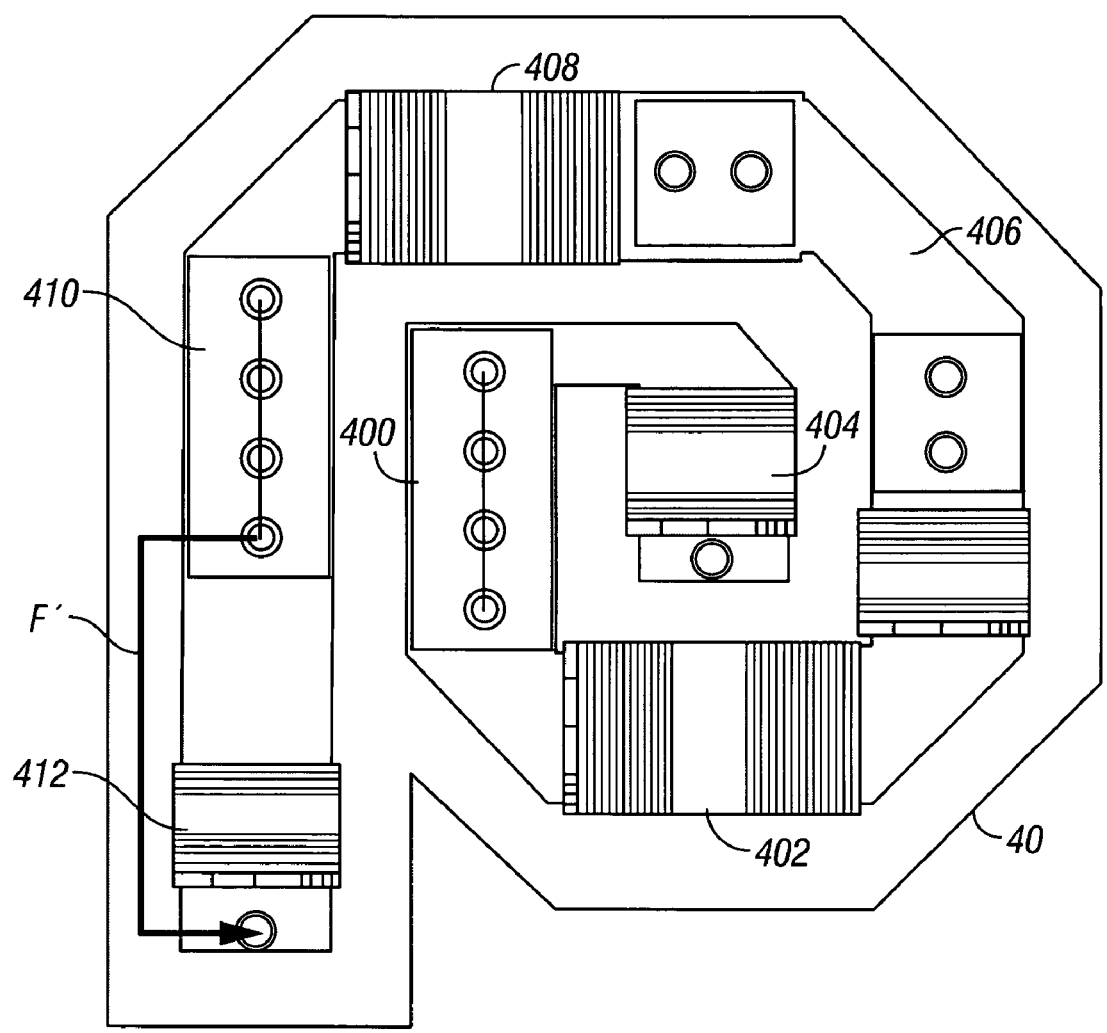
FIG. 4 depicts a third illustrative embodiment of a box-shaped compact fuel processor of the present invention.
Figure 5:
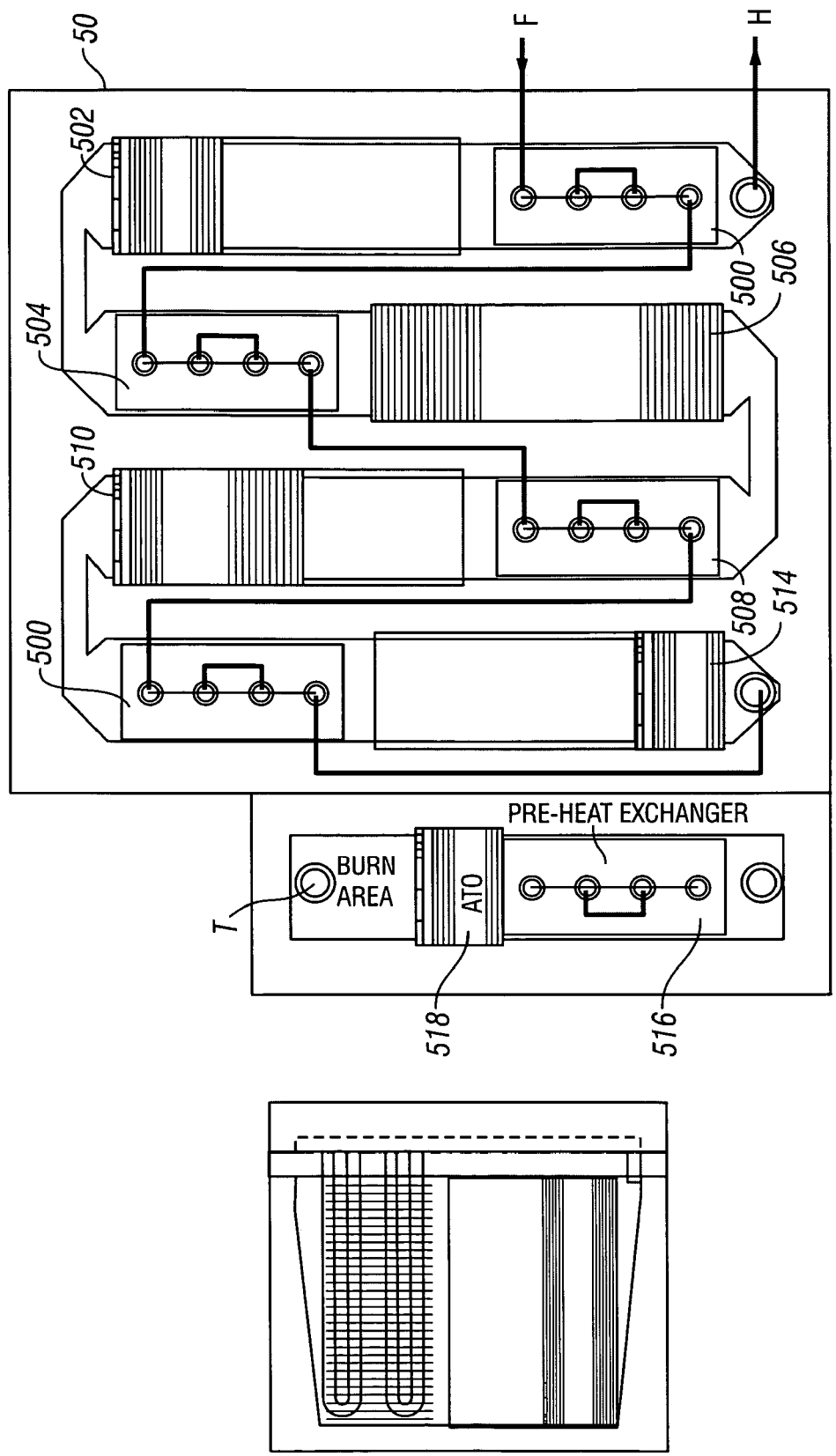
FIG. 5 depicts a fourth illustrative embodiment of a box-shaped compact fuel processor of the present invention.

Referring still to FIG. 2, hydrocarbon fuel or alternatively a fuel/oxygen or alternatively a fuel/oxygen/water mixture F, is introduced through the top manifold (not shown) to the utility side of heat exchanger 200. The process side of heat exchanger 200 cools the hydrogen rich gas after contacting the water gas shift catalyst bed 202, and before contacting the preferential oxidation catalyst bed 204. The preheated fuel then leaves heat exchanger 200 and is routed through the manifold to the utility side of heat exchanger 206 for further preheating. The process side of heat exchanger 206 cools the hydrogen rich gas after contacting the desulfurization catalyst bed 208, and before contacting the water gas shift catalyst bed 202. The preheated fuel then leaves heat exchanger 206 and is routed through the manifold to heat exchanger 210 for further preheating. The process side of heat exchanger 210 cools the hydrogen rich gas after contacting the autothermal reforming bed 212, and prior to contacting the desulfurization catalyst bed 208. In this illustrative embodiment, the preheated fuel then leaves heat exchanger 210 and is routed through the manifold to heat exchanger 214 for further preheating. Heat exchanger 214 is designed specifically to heat the hydrocarbon fuel against the effluent of anode tail gas oxidizer 216, which oxidizes (burns) anode tail gas from a fuel cell (not shown). The heated hydrocarbon fuel F' is then routed by the manifold to the autothermal catalyst bed 212 for conversion hydrogen rich gas. This process is generally as described above in the description of FIG. 1. One of skill in the art should recognize that numerous design alternatives are available to the operator of this apparatus. Such considerations are, but are not limited to, shape of the individual process units, cross section of the processor as a whole, design of the manifold for efficient transfer of streams, design of the heat exchangers, and controls for adequately maintaining the process and feed temperatures at desired levels. Another consideration is the inclusion of the anode tail gas oxidizer. Although the order of the process units is generally set, another consideration is the relative location of each process unit relative to each other process unit. For example, in the illustrative embodiment of FIG. 2, the "channel" of connected process units consists of a spiral, with the autothermal reforming catalyst bed 212 located on the outside of the spiral, and with the anode tail gas oxidizer 216 located in a separate channel outside of the spiral. FIGS. 3-5 illustrate three other approaches to the processor design that are envisioned by the present invention.

FIG. 3 depicts an alternative embodiment of the present invention, illustrating an overhead view of box-shaped fuel processor 30 that is an illustrative embodiment of the present invention, with the top manifold (not shown) removed. Hydrocarbon fuel or alternatively a fuel/oxygen or alternatively a fuel/oxygen/water mixture F, is introduced through the top manifold (not shown) to the utility side of heat exchanger 300. The process side of heat exchanger 300 cools the hydrogen rich gas after contacting the water gas shift catalyst bed 302, and prior to contacting the preferential oxidation catalyst bed 304. The preheated fuel then leaves heat exchanger 300 and is routed through the manifold to the utility side of heat exchanger 306 for further preheating. The process side of heat exchanger 306 cools the hydrogen rich gas after contacting the desulfurization catalyst bed 308, and prior to contacting the water gas shift catalyst bed 302. The preheated fuel then leaves heat exchanger 306 and is routed through the manifold to heat exchanger 310 for further preheating. The process side of heat exchanger 310 cools the hydrogen rich gas after contacting the autothermal reforming bed 312, and prior to contacting the desulfurization catalyst bed 308. In this illustrative embodiment, the preheated fuel then leaves heat exchanger 310 and is routed through the manifold to heat exchanger 314 for further preheating. Heat exchanger 314 is designed specifically to heat the hydrocarbon fuel against the effluent of anode tail gas oxidizer 316, which oxidizes (burns) anode tail gas from a fuel cell (not shown). The heated hydrocarbon fuel F' is then routed by the manifold to the autothermal catalyst bed 312 for conversion hydrogen rich gas. This process is generally as described above in the description of FIG. 1. In the illustrative embodiment of FIG. 3, the "channel" of connected process units consists of a spiral, with the autothermal reforming catalyst bed 312 located on the inside of the spiral, and with the anode tail gas oxidizer 316 located in a separate channel inside of the spiral.

FIG. 4 depicts an alternative embodiment of the present invention, illustrating an overhead view of box-shaped fuel processor 40 that is an illustrative embodiment of the present invention, with the top manifold (not shown) removed. Hydrocarbon fuel or alternatively a fuel/oxygen or alternatively a fuel/oxygen/water mixture F, is introduced through the top manifold (not shown) to the utility side of heat exchanger 400. The process side of heat exchanger 400 cools the hydrogen rich gas after contacting the water gas shift catalyst bed 402, and prior to contacting the preferential oxidation catalyst bed 404. The preheated fuel then leaves heat exchanger 400 and is routed through the manifold to the utility side of heat exchanger 406 for further preheating. The process side of heat exchanger 406 cools the hydrogen rich gas after contacting the desulfurization catalyst bed 408, and prior to contacting the water gas shift catalyst bed 402. The preheated fuel then leaves heat exchanger 406 and is routed through the manifold to heat exchanger 410 for further preheating. The process side of heat exchanger 410 cools the hydrogen rich gas after contacting the autothermal reforming bed 412, and prior to contacting the desulfurization catalyst bed 408. In this illustrative embodiment, the preheated fuel F' then leaves heat exchanger 410 and is routed through the manifold to the autothermal reforming catalyst bed 412 for conversion hydrogen rich gas. Note that this figure illustrates the concept that an anode tail gas oxidizer and its preheat exchanger are not required in order to adequately design a processor to preheat the hydrocarbon fuel feed. Once the preheated hydrocarbon fuel feed F' enters autothermal reforming catalyst bed 412, the process proceeds as is generally described above in the description of FIG. 1. In this illustrative embodiment, the "channel" of connected process units consists of a spiral, with the autothermal reforming catalyst bed 312 located on the inside of the spiral.

FIG. 5 depicts a side view of box-shaped fuel processor 50 that is an illustrative embodiment of the present invention, with the manifold (not shown) removed. Hydrocarbon fuel or alternatively a fuel/oxygen or alternatively a fuel/oxygen/water mixture F, is introduced through the manifold (not shown) to the utility side of heat exchanger 500. The process side of heat exchanger 500 cools down the final hydrogen rich gas after contacting the preferential oxidation catalyst bed 502. The preheated fuel then leaves heat exchanger 500 and is routed through the manifold to the utility side of heat exchanger 504 for further preheating. The process side of heat exchanger 504 cools the hydrogen rich gas after contacting the water gas shift catalyst bed 506, and prior to contacting the preferential oxidation catalyst bed 502. The preheated fuel then leaves heat exchanger 504 and is routed through the manifold to the utility side of heat exchanger 508 for further preheating. The process side of heat exchanger 508 cools the hydrogen rich gas after contacting the desulfurization catalyst bed 510, and prior to contacting the water gas shift catalyst bed 506. The preheated fuel then leaves heat exchanger 508 and is routed through the manifold to heat exchanger 512 for further preheating. The process side of heat exchanger 512 cools the hydrogen rich gas after contacting the autothermal reforming bed 514, and prior to contacting the desulfurization catalyst bed 510. In this illustrative embodiment, the preheated fuel F' then leaves heat exchanger 512 and is routed through the manifold to the autothermal catalyst bed 514 for conversion to hydrogen rich gas. This process proceeds as is generally described above in the description of FIG. 1. In this illustrative embodiment, the "channel" of connected process units consists of a spiral which is organized in a parallel passes, with each pass alternating between heat exchanger and catalyst bed. For example, heat exchanger 512, desulfurization catalyst bed 510, heat exchanger 504, and preferential oxidation catalyst bed 502 are aligned so as to better dissipate the heat in the ceramic casting.

In view of the above disclosure, one of ordinary skill in the art should understand and appreciate that the present invention includes many possible illustrative embodiments that depend upon design criteria. One such illustrative embodiment includes a compact fuel processor for converting a hydrocarbon fuel feed into hydrogen rich gas, in which the fuel processor assembly includes a container having a bottom and substantially vertical sides, a removable top for the container, wherein the removable top comprises a manifold, a plurality of connected process units positioned in a spiraling geometry within the container, and a ceramic casting that fills the void space inside the container, wherein the plurality of connected process units forms a channel through the ceramic casting. In such an embodiment, the plurality of connected process units comprises an autothermal or steam reforming catalyst bed, a first heat exchanger positioned adjacent to the autothermal or steam reforming catalyst bed, a desulfurization agent bed positioned adjacent to the first heat exchanger, a second heat exchanger positioned adjacent to the desulfurization agent bed, a water gas shift catalyst bed positioned adjacent to the second heat exchanger, a third heat exchanger positioned adjacent to the water gas shift catalyst bed, and a carbon monoxide oxidation catalyst bed positioned adjacent to the third heat exchanger. Optionally, an embodiment of the present invention comprises a second plurality of connected process units positioned within the container, wherein the second plurality of connected process units forms a channel through the ceramic casting, wherein the second plurality of connected process units comprises an anode tail gas oxidation catalyst bed, and a pre-heat exchanger positioned adjacent to the anode tail gas oxidation catalyst bed. Such an apparatus utilizes its manifold to provide preheating means for preheating the hydrocarbon before the hydrocarbon fuel contacts the autothermal or steam reforming catalyst bed. In one embodiment of the present invention, each of the first, second, and third heat exchangers has a tube side and a process side, and the preheating means comprises introducing the hydrocarbon fuel to the tube side of at least one of the first heat exchanger, the second heat exchanger, or the third heat exchanger. The manifold comprises means for introducing the hydrocarbon fuel to the tube side of the third heat exchanger to produce a first preheated feed, means for introducing the first preheated feed to the tube side of the second heat exchanger to produce a second preheated feed, means for introducing the second preheated feed to the tube side of the first heat exchanger to produce a third preheated feed, and means for introducing the third preheated feed to the autothermal or steam reforming catalyst bed. Alternatively, in the event that an anode tail gas oxidizer is included with the processor design, or in the event that a fourth heat exchanger is otherwise included in the design downstream of the preferential oxidation catalyst bed, the manifold also comprises means for introducing the third preheated feed to the pre-heat exchanger or the fourth heat exchanger prior to introducing the preheated feed to the autothermal or steam reforming catalyst bed. It is envisioned that a preferred aspect of the manifold is that the means for routing streams throughout the processor is by use of a piping, tuning, or an equivalent, that flanges or snaps into place in the appropriate locations with the box processor.

Another such illustrative embodiment includes a method for using such a box-shaped compact fuel processor for converting a hydrocarbon fuel feed into hydrogen rich gas. The method includes providing a box-shaped fuel processor comprising an autothermal reforming catalyst bed, a first heat exchanger positioned adjacent to the autothermal or steam reforming catalyst bed, the first heat exchanger having a utility side and a process side, a desulfurization agent bed positioned adjacent to the first heat exchanger, a second heat exchanger positioned adjacent to the desulfurization agent bed, the second heat exchanger having a utility side and a process side, a water gas shift catalyst bed positioned adjacent to the second heat exchanger, a third heat exchanger positioned adjacent to the water gas shift catalyst bed, the third heat exchanger having a utility side and a process side, and a carbon monoxide oxidation catalyst bed positioned adjacent to the third heat exchanger. In this preferred embodiment of the present invention, the box-shaped processor may be used to preheat the hydrocarbon fuel in the utility side of at least one of the first heat exchanger, the second heat exchanger, or the third heat exchanger, then reform the preheated hydrocarbon fuel in the autothermal reforming catalyst bed to produce a first hydrogen product, then remove the sulfur compounds from the first hydrogen product in the desulfurization agent bed to produce a second hydrogen product, then remove carbon monoxide from the second hydrogen product in the water gas shift catalyst bed to produce a third hydrogen product, then introduce an oxygen-containing gas to the third hydrogen product to produce a fourth hydrogen product, and then oxidize the fourth hydrogen product to produce a hydrogen rich gas that is substantially free of carbon monoxide. It is a preferred aspect of this embodiment that the hydrogen rich gas produced is suitable for direct feed to a fuel cell, or for storage in a metal hydride storage system, compressed hydrogen storage, or liquefied hydrogen storage, or contains less than about 50 ppm carbon monoxide, or more preferably less than about 10 ppm carbon monoxide.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. An apparatus for converting hydrocarbon fuel to hydrogen rich gas, comprising:
    a container having a top, bottom and substantially vertical sides, wherein the top comprises a manifold;
    a plurality of connected process units positioned in a spiraling geometry within the container;
    a ceramic casting that fills the void space inside the container, wherein the plurality of connected process units form a channel through the ceramic castings;
    wherein the plurality of connected process units comprises an autothermal or steam reforming catalyst bed;
    a first heat exchanger positioned adjacent to the autothermal reforming catalyst bed;
    a desulfurization agent bed positioned adjacent to the first heat exchanger;
    a second heat exchanger positioned adjacent to the desulfurization agent bed;
    a water gas shift catalyst bed positioned adjacent to the second heat exchanger;
    a third heat exchanger positioned adjacent to the water gas shift catalyst bed; and
    a carbon monoxide oxidation catalyst bed positioned adjacent to the third heat exchanger.

2. The apparatus of claim 1, wherein the manifold provides preheating means for preheating the hydrocarbon before the hydrocarbon fuel contacts the autothermal or steam reforming catalyst bed.

3. The apparatus of claim 2, wherein each of the first, second, and third heat exchangers has a utility side and a process side, and the preheating means comprises introducing the hydrocarbon fuel to the utility side of at least one of the first heat exchanger, the second heat exchanger, or the third heat exchanger.

4. The apparatus of claim 1, wherein the manifold comprises:
    means for introducing the hydrocarbon fuel to the utility side of the third heat exchanger to produce a first preheated feed;
    means for introducing the first preheated feed to the utility side of the second heat exchanger to produce a second preheated feed;
    means for introducing the second preheated feed to the utility side of the first heat exchanger to produce a third preheated feed; and
    means for introducing the third preheated feed to the autothermal or steam reforming catalyst bed.

5. The apparatus of claim 1, further comprising a second plurality of connected process units positioned within the container, wherein the second plurality of connected process units comprises an anode tail gas oxidation catalyst bed and a pre-heat exchanger positioned adjacent to the anode tail gas oxidation catalyst bed.

6. The apparatus of claim 5, wherein each of the first, second, third, and pre-heat exchangers has a utility side and a process side, and the preheating means comprises means for introducing the hydrocarbon fuel to the utility side of at least one of the first heat exchanger, the second heat exchanger, the third heat exchanger, or the preheat exchanger.

7. The apparatus of claim 6, wherein the manifold comprises:
    means for introducing the hydrocarbon fuel to the utility side of the third heat exchanger to produce a first preheated feed;
    means for introducing the first preheated feed to the utility side of the second heat exchanger to produce a second preheated feed;
    means for introducing the second preheated feed to the utility side of the first heat exchanger to produce a third preheated feed;
    means for introducing the third preheated feed to the utility side of the pre-heat exchanger to produce a fourth preheated feed; and
    means for introducing the fourth preheated feed to the autothermal or steam reforming catalyst bed.

8. The apparatus of claim 1, wherein the plurality of connected process units further comprises a fourth heat exchanger positioned downstream of the carbon monoxide oxidation catalyst bed.

9. The apparatus of claim 8, wherein each of the first, second, third, and fourth heat exchangers has a utility side and a process side, and the preheating means comprises introducing the hydrocarbon fuel to the utility side of at least one of the first heat exchanger, the second heat exchanger, the third heat exchanger, or the fourth heat exchanger.

10. The apparatus of claim 9, wherein the manifold comprises:
    means for introducing the hydrocarbon fuel to the utility side of the fourth heat exchanger to produce a first preheated feed;
    means for introducing the first preheated feed to the utility side of the third heat exchanger to produce a second preheated feed;
    means for introducing the second preheated feed to the utility side of the second heat exchanger to produce a third preheated feed;
    means for introducing the third preheated feed to the utility side of the first heat exchanger to produce a fourth preheated feed; and
    means for introducing the fourth preheated load to the autothermal or steam Reforming catalyst bed.

* * * * *